June 3, 1930.  E. E. GREVE  1,761,825
SHEAVE
Filed June 24, 1926

Inventor
E. E. Greve
By W. J. Doolittle
Attorney

Patented June 3, 1930

1,761,825

UNITED STATES PATENT OFFICE

EDGAR E. GREVE, OF BELLEVUE, PENNSYLVANIA, ASSIGNOR TO OIL WELL SUPPLY COMPANY, OF PITTSBURGH, PENNSYLVANIA, A CORPORATION OF PENNSYLVANIA

SHEAVE

Application filed June 24, 1926. Serial No. 118,212.

My invention relates to improvements in sheaves and the method of making the same.

Sheaves or pulley wheels of the type of my invention are particularly designed for use in connection with oil well drilling rigs using wire rope transmission, and it is of great importance to provide a good wearing surface for the groove in which the wire rope is positioned.

Sheaves have heretofore been made from alloy steel in order to overcome the wearing tendency of the wire rope; such sheaves, however, are so expensive to manufacture as to almost prohibit their use. Attempts have been made to construct a sheave of cheaper material having a hardened wearing surface for the wire rope, but such sheaves have proven unsatisfactory, owing to the unsuccessful hardening of the grooved portion of the sheave.

One object of my invention is to economically produce a sheave of this class, made of a relatively inexpensive cast metal, capable of being treated to provide a hardened grooved wire rope wearing surface, designed to keep the wear down to a minimum.

Figure 1:
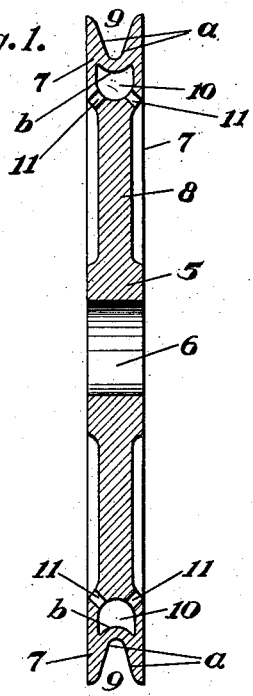
Figure 2:
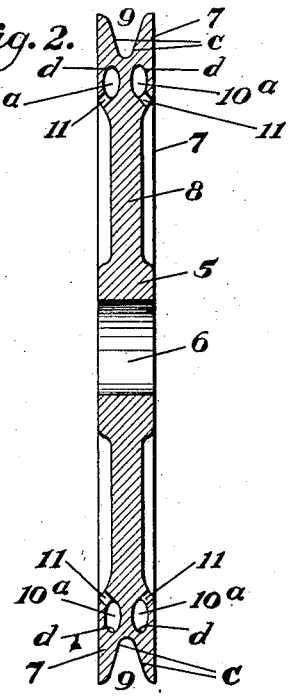

In the accompanying drawings, which illustrate forms of sheaves or pulley wheels embodying my invention:

Fig. 1 is a central vertical sectional view of a sheave constructed in accordance with my invention;

Fig. 2, a similar view, showing a modified form of my invention; and

Figure 3:
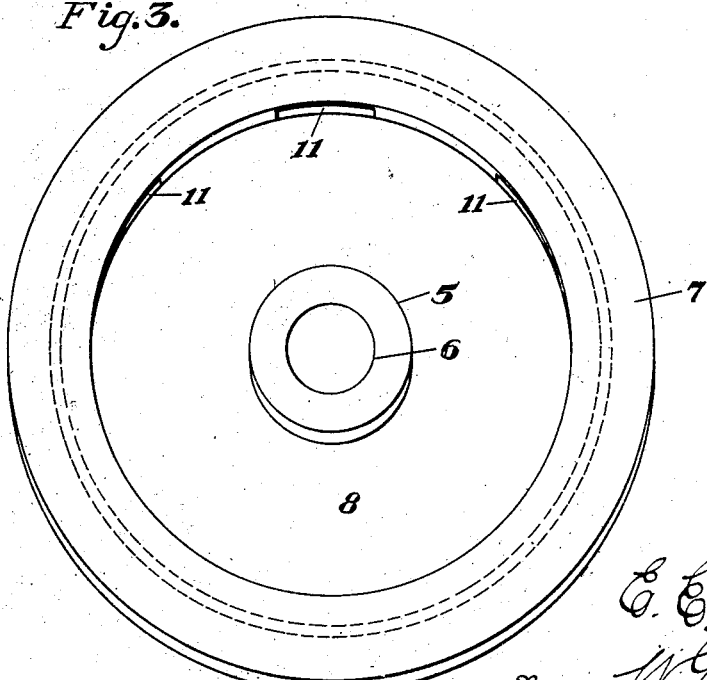

Fig. 3, a side elevational view of the sheave.

Referring to the drawings, each of the sheaves shown includes a hub 5 having an opening 6, a peripheral enlarged portion or rim 7, and an intermediate body portion 8 located between the hub and the portion 7. Portion 7 is formed with a groove 9, an annular opening or space 10, and with a series of openings 11 leading from the annular space 10 to the outer surface of the enlarged portion 7.

In the form of sheave shown in Fig. 2, there are two spaced apart annular spaces $10^a$ adjacent the grove 9, instead of the single opening 10. This latter form of sheave provides a construction that is probably better adapted for heavy work than the form of Fig. 1.

A characteristic and important feature of the present invention resides in hardening the metal entering into the formation of the groove and a portion of the metal adjacent the groove. In the form of Fig. 1, $a$ and $b$ designate the hardened surfaces, and in Fig. 2, $c$ and $d$ designate the said hardened surfaces.

In casting the sheave, it is preferably formed in sand molds, which are provided with a suitable core or cores to form the space 10, and with chill pieces or members to form the hardened surfaces $a$ and $b$ of the form of Fig. 1. In addition to providing the molds with the said means for forming the annular space 10 and the surfaces $a$ and $b$, means are provided for forming the passages or openings 11. These openings 11 are provided to permit the core and the chill pieces employed in forming the space and effecting the desired hardening to be removed.

In following my method of manufacture, it is important that provision be made to produce a casting having the cross section of that portion of the rim between the groove and the interior annular space of uniform cross section, and of such a thickness that the said portion may be properly hardened by chilling. In the forms illustrated, it will be noted that I have provided constructions embodying these features.

The method followed in making the sheave of the form of Fig. 2 is very similar to the method employed in manufacturing the form of Fig. 1, the main difference being that two independent cores or a series of independent cores are used for forming the two spaced apart annular openings $10^a$, and, of course, chill pieces are employed for chilling portions of the walls of the two interior openings $10^a$. By making the above mentioned cross sections relatively uniform, the desired grooved surfaces and the surfaces of the metal adjacent thereto may be properly chilled, thereby providing a satisfactory hardened wearing surface on a sheave made from relatively soft and inexpensive material.

What I claim is:

1. A cast metal sheave having a hub, a body portion extending therefrom consisting of a single relatively thick wall, a rim surrounding the body portion, said rim having an exterior groove and an annular space relatively close thereto, and the wall of the sheave between said groove and said space being chilled on its periphery and on the surface opposite to said periphery.

2. A cast metal sheave having a hub, a body portion extending therefrom consisting of a single relatively thick wall, a rim surrounding the body portion, said rim having an exterior groove and an annular space relatively close thereto, and the wall of the sheave between said groove and said space being hardened on its periphery and on the surface opposite to said periphery.

3. A cast metal sheave having a hub, a body portion extending therefrom, a rim surrounding the body portion, the transverse extent of metal used in the body portion and rim being substantially the same, said rim having a peripheral groove and an annular space relatively close to the groove, and openings communicating with said space arranged at substantially the junction of said body and rim and the wall between said groove and space being chilled on opposite sides.

In testimony whereof I affix my signature.

EDGAR E. GREVE.